July 30, 1940.  J. L. ANDERSON  2,209,372
METHOD OF WELDING
Filed Sept. 18, 1937
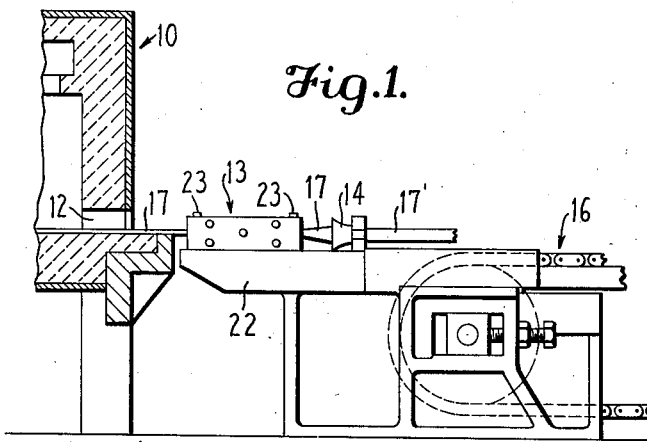
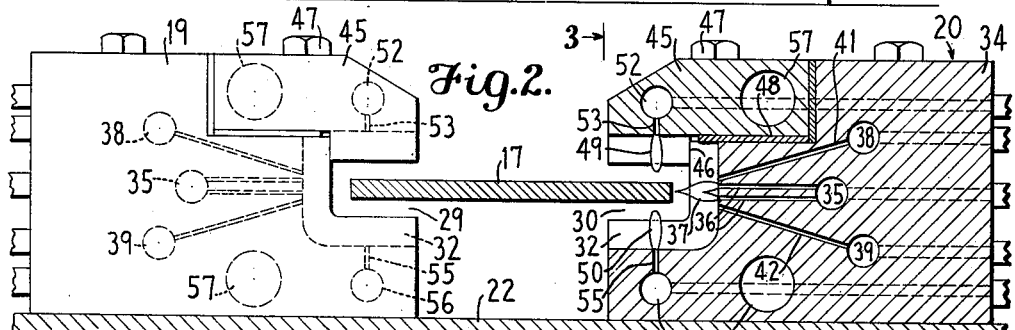
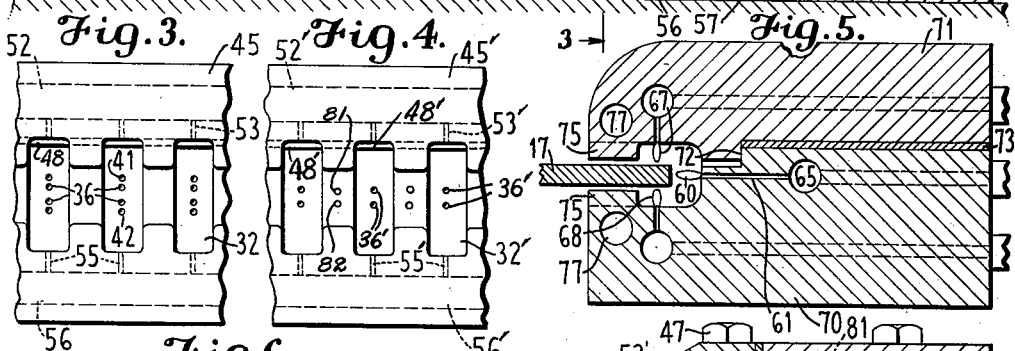
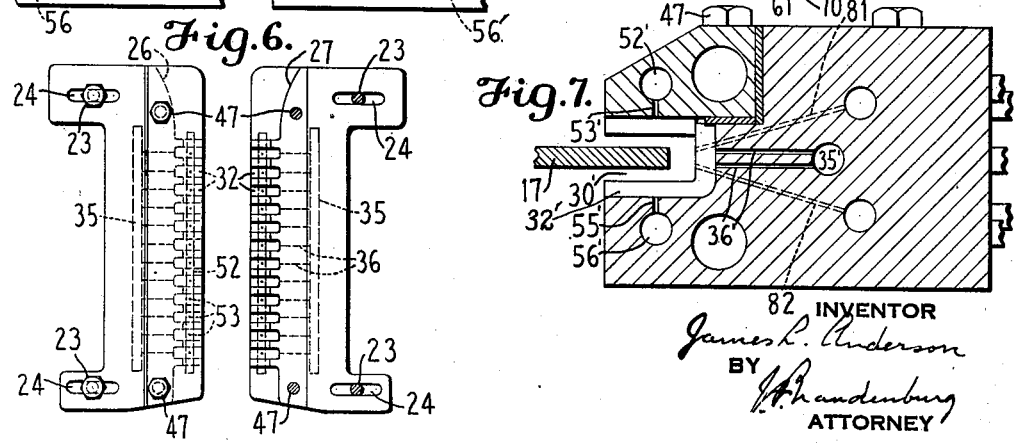
INVENTOR
James L. Anderson
BY
J. H. Brandenburg
ATTORNEY Patented July 30, 1940

2,209,372

UNITED STATES PATENT OFFICE 2,209,372

METHOD OF WELDING

James L. Anderson, Closter, N. J., assignor to Air Reduction Company, Incorporated, New York, N. Y., a corporation of New York Application September 18, 1937, Serial No. 164,440

5 Claims. (Cl. 205—12)

This invention relates to methods of welding, and more especially to the heating of the edge faces of skelp in the manufacture of pipes and tubing. The invention will be described in connection with tube making, but it will be understood that features of the invention are applicable to the heating of metal edges generally preparatory to bringing them together to make a weld.

In one of the most advantageous methods of making welded tubes, skelp is pulled from a furnace, in which the entire body of the skelp has been preheated, moved through a retort and then into forming and closing apparatus such as rolls or a stationary die or bell. While the skelp travels through the retort, the edge faces are heated locally to bring them to a welding condition before they are brought together to make the weld. The forming of the skelp and closing of the seam is sometimes done in roll passes instead of dies, and the edge heating may be done after the skelp is partly formed. The preheating furnace can be dispensed with, though the absence of preheating reduces the speed and economy of the process.

It is an object of this invention to provide an improved method of heating metal edges preparatory to bringing the edges together to make a weld. One object is to effect a more rapid heating of the edge faces of a moving skelp so that with a given length of retort the welding process can proceed at higher speed. One way in which the invention increases the rate of heating is by checking conduction losses from edge faces against which heating agencies are directly projected. Raising the temperature of the edges at a rapid rate within a short distance instead of at a slower rate over considerably longer space is particularly important when equipping existing pipe and tube mills to manufacture by the more modern edge heating methods. In such cases, slight differences in retort length often determine whether or not the mill must be rebuilt to equip it for modern high-speed methods.

Another object of the invention is to provide a method of heating the edge faces of a traveling skelp rapidly and effectively, at lower preheating temperatures, and with greater economy than in the prior art. Oxygen or air blasts directed against the edge faces of the skelp have been used in the past to increase the temperature of the edges, but such methods have numerous disadvantages, among which are the high temperature to which the entire body of the skelp must be heated in the furnace in order to make the air and oxygen blasts effective, and the fact that any substantial amount of heating by means of oxygen blasts burns the edges excessively, causing a considerable loss in metal. Heating with oxyacetylene flame jets has proved more advantageous.

In accordance with one feature of this invention the effectiveness of a system of oxy-fuel gas heating flames, such as oxyacetylene flames, is increased by means of oxygen streams related to the flame jets in a manner which obtains a cooperative heating. The extra heating gained by the use of additional oxygen increases the economy of the heating because the oxygen streams are heated by the oxy-fuel gas flames and because the cost of oxygen is less than that of acetylene. I find that with some grades of skelp, ratios as high as 5 parts of oxygen to 2 of acetylene can be used with this invention without objectionable burning of the edges.

Other objects, features and advantages of the invention will appear or be pointed out as the specification proceeds.

In the accompanying drawing, forming part hereof:

Fig. 1 is a fragmentary side view, partly in section, of tube welding apparatus for welding in accordance with the invention;

Fig. 2 is a greatly enlarged end view of the retort of Fig. 1, the right-hand portion of the retort being shown in section;

Fig. 3 is a view taken on the line 3—3 of Fig. 2 with its skelp removed;

Fig. 4 is a view similar to Fig. 3, but showing a modified form of apparatus for welding according to this invention;

Fig. 5 is a sectional view similar to the right-hand portion of Fig. 2, but showing a second modified form of apparatus;

Fig. 6 is an enlarged plan view of the retort of Fig. 1 with the skelp omitted and the cover of one of the retort blocks removed; and Fig. 7 is a sectional view similar to Fig. 5, but showing the modified form of the apparatus illustrated in Fig. 4.

The tube welding apparatus shown in Fig. 1 includes a furnace 10 in which skelp is preheated. The furnace has a mouth 12 and there is a retort 13 located near the mouth of the furnace so that as the skelp is pulled from the furnace it passes through the retort, where local heating brings the edges of the skelp to a welding condition.

A closing die or bell 14, just beyond the retort 13, bends the skelp to tubular form and brings the edges together to make a weld. The skelp is pulled from the furnace 10 and through the retort 13 and bell 14 by a drawbench 16. The skelp is indicated by the reference character 17 and the welded tube by the reference character 17'.

The equipment shown in Fig. 1 is representative of welding apparatus. The retort 13 can be used without a furnace for preheating the skelp though a furnace reduces the amount of heating that the retort is called upon to do and thereby increases the speed and economy of the welding. The forming and welding of the tube may be done in other welding apparatus, and other expedients can be employed instead of the drawbench.

The retort 13 comprises left and right-hand portions 19 and 20, respectively, spaced from one another and fastened to a base 22 by screws 23. These screws extend through slots 24 (Fig. 6) in the retort. The slots make it possible to adjust the spacing of the right and left-hand portions of the retort to accommodate different widths of skelp.

There are guide surfaces 26, 27 forming a flaring entrance through which skelp is pulled into the retort. The edges of the skelp travel through confronting guideways or channels 29 and 30 (Fig. 2). The walls of the channels have transversely extending grooves 32. The right-hand portion 20 of the retort is shown in section in Fig. 2, and it includes a block 34 containing a number of gas chambers extending lengthwise of the block.

These chambers include a central chamber 35 from which a row of jet orifices 36 extend through a wall of the channel 30, each of the jet orifices 36 opening into one of the grooves 32 and being disposed to project a jet directly against the edge face of the skelp 17. The drawing shows a double row of jet orifices 36, but most of the advantages of the invention can be obtained with a construction having only a single row of jet orifices communicating with the central chamber 35.

Upper and lower chambers 38 and 39 in the block 34 have converging jet passages 41 and 42 which open into the grooves 32 a short distance above and below the jet passages 36, as shown in Fig. 3. By supplying a mixture of oxygen and fuel gas, preferably acetylene, to the central chamber 35, oxy-fuel gas heating flames 37 can be projected against the edge face of the skelp. Oxygen, either commercially pure or diluted with inert gases, is supplied to the chambers 38 and 39. This oxygen is under pressure which causes streams or blasts of oxygen to issue from the jet orifices 41, 42, and these streams, being at an angle to the heating flames 37, distort the flames into flatter and broader flames, which effect a more intense heating of the edge faces of the skelp. The oxygen streams may issue from their orifices at lower velocities than used for the oxy-fuel gas mixtures of the flame jets.

The same apparatus can be used in a different way by supplying the oxygen and fuel gas mixture to each of the upper and lower chambers 38, 39 and the oxygen to the center chamber 35. When the jets are in such relation, however, the heating effect of the flames is less concentrated and oxygen is generally supplied in sufficient quantity to obtain a substantial amount of heat by burning of the metal. With the preferred relation where the center flames 37 are flanked by streams of oxygen from the orifices 41, 42, the amount of oxygen supplied through these orifices may be only enough to burn the envelope gases in the immediate vicinity of the skelp edges, in which case no burning of the metal occurs.

A removable cover 45 has a grooved face which forms the upper wall of the channel 30 and has a shoulder 46 which abuts against the block 34 to position the cover accurately on the block. A shim 48 between the block 34 and cover 45 determines the width of the open side of the channel 30. The cover 45 is fastened in place by screws 47.

The edge faces of the skelp can be heated quicker if conduction losses from them back into the body of the skelp are checked. This result is obtained by projecting rows of heating flames against the upper or lower, or both, surfaces of the skelp a short distance back of the edge faces. Heating flames 49, 50 for checking conduction losses are shown in Fig. 2. An oxy-fuel gas mixture for the heating flames 49 is supplied from a chamber 52 through jet orifices 53 in the cover 45, while gas for the heating flames 50 is supplied through jet orifices 55 from a chamber 56 in the block 34. Passages 57 for cooling fluid are provided in the cover 45 and block 34.

The construction of the left-hand portion 19 of the retort is similar to that of the right-hand portion described above with the necessary reversals to permit it to function on the opposite side of the skelp. The channels 29 and 30 are guideways for the skelp 17 and serve to smooth out any waves in the skelp or to prevent any substantial displacement of the edges away from the heating agencies.

Fig. 5 shows a modified form of the apparatus in which the edge face of the skelp 17 is heated by a row of flames 60 each of which issues from a jet orifice 61 extending through a wall of the lower block of the retort and communicating with a chamber 65 extending lengthwise of the retort and corresponding to the chamber 35 of the retort shown in Fig. 2. Heat losses by conduction from the edge faces of the skelp are checked in the retort of Fig. 5 by heating flames 67, 68 directed against the upper and lower surfaces of the skelp in the same manner as the flames 49, 50 previously described. Oxygen jets instead of flames may be projected from the orifices 61 when substantial burning of the skelp edges is not objectionable. In such a case the flames 67, 68 check conduction losses so that less metal has to be burned to raise the temperature than has been the case with oxygen blast methods of the prior art.

The retort of Fig. 5 has a lower block 70 and an upper or cover block 71. These blocks abut along shoulders 72 and are vertically spaced by a shim 73 to obtain the desired channel height for the skelp. The guideway or channel between the blocks 70, 71 differs from that of Fig. 2 in that ribs 75 extending only a part of the way across the upper and lower walls of the channel are provided instead of grooved channels such as shown in Fig. 2. The blocks 70, 71 are provided with cooling chambers 77.

Figs. 4 and 7 show apparatus which has the same flame heating facilities as Fig. 2 but which supplements the flame heating by a different use of oxygen streams. Each of the flame jet orifices, the chambers which supply them gas, and the upper and lower parts of the retort are indicated by the same reference character as in Fig. 2 with a prime appended. Instead of supplying oxygen streams near the flame jets, as in Fig. 2, however, the retort of Figs 4 and 7 has jet orifices 81, 82 which open through the wall of the channel 30' at points substantially midway between heating flames.

This relation of jets subjects a traveling skelp to alternate applications of flame heating and oxygen. Both expedients raise the temperature of the edges, but in a different way. The flames supply heat generated by the combustion of the gases which flow from the jet orifices. The oxygen, when supplied between heating jets in this manner causes the products of combustion of the primary heating flames to burn with great intensity close to the skelp edges and if sufficient oxygen is supplied it burns the edge faces to generate additional heat in the skelp as the edges pass between the heating flames.

Terms of orientation are, of course, relative. The skelp is heated in a flat condition in all of the embodiments of the invention illustrated, but the invention can be employed with partially formed skelp. Other modifications may be made and some features of the invention used without others.

I claim:

1. The method of heating the edge faces of a skelp that is pulled out of a heating furnace and through forming and welding apparatus that bends the skelp and brings the edges together progressively along the length of the skelp, which method comprises projecting a series of heating flames directly against an edge face of the moving skelp at spaced apart points along the length of the edge face, projecting oxidizing blasts against the moving edge face at regions between the successive heating flames, and burning in said heating flames a fuel that produces actively reducing products of combustion so that the edge face is subjected to alternate oxidation and reduction as the skelp approaches the forming and welding apparatus.

2. The method of heating the edge faces of a moving skelp to a welding condition, which method comprises projecting a series of heating flames directly against an edge face of the moving skelp at spaced apart points along the length of the edge face, and projecting oxidizing blasts against the moving edge face at regions between the successive heating flames.

3. The method of raising the edge faces of a moving skelp to a welding condition, which method comprises projecting from a plurality of orifices high-intensity reducing flame jets and projecting said flame jets directly against an edge face of the skelp along a substantial length of the edge face, and increasing the heating by projecting from other orifices oxidizing jets without mixed fuel gas, the oxidizing jets being projected against the edge face along the region of the flame heating and in close proximity to the flame jets.

4. The method of heating to a welding condition the edge face of moving skelp that has upper and lower horizontal surfaces and a vertical edge face between said upper and lower surfaces, which method comprises projecting heating jets horizontally into direct impingement against the edge face along a substantial length of the edge face and in a manner to produce a substantially uniform heating of the edge face across its full height, and increasing the effective rate of the edge heating by projecting independent heating jets at right angles to the direction of the edge heating jets and into contact with the upper surface of the skelp a short distance from the edge of the skelp, said independent heating jets being fewer in number than the edge heating jets so that the heat applied to the upper surface is less than that applied to the edge face, and heating the lower surface of the skelp near the edge face in a manner similar to the upper surface in order to maintain the uniform heat distribution across the edge face.

5. The method of heating to a welding condition the edge face of a moving skelp that has upper and lower surfaces and an edge face between said upper and lower surfaces, which method comprises projecting heating jets into direct impingement against the edge face along a substantial length of the edge face and in a manner to produce a substantially uniform heating of the edge face across its full height, and increasing the effective rate of edge heating by projecting independent heating jets into direct impingement against at least one of said upper and lower surfaces a short distance from the edge of the skelp, and limiting the heating by said independent heating jets to an amount insufficient to melt the skelp surface against which said independent heating jets impinge.

JAMES L. ANDERSON.